United States Patent
Khalil et al.

(10) Patent No.: US 11,487,035 B2
(45) Date of Patent: Nov. 1, 2022

(54) PRESTACK LEAST-SQUARE REVERSE TIME MIGRATION ON SURFACE ATTRIBUTE GATHERS COMPRESSED USING DEPTH-INDEPENDENT COEFFICIENTS

(71) Applicant: CGG SERVICES SAS, Massy (FR)

(72) Inventors: Adel Khalil, Rio de Janeiro (BR); Carlos Alberto Da Costa Filho, Rio de Janeiro (BR); Roberto Pereira, Rio de Janeiro (BR); Gregório Goudel Azevedo, Rio de Janeiro (BR)

(73) Assignee: CGG SERVICES SAS, Massy (FR)

( * ) Notice: Subject to any disclaimer, the term of this patent is extended or adjusted under 35 U.S.C. 154(b) by 421 days.

(21) Appl. No.: 16/851,825

(22) Filed: Apr. 17, 2020

(65) Prior Publication Data
US 2021/0055443 A1    Feb. 25, 2021

Related U.S. Application Data

(60) Provisional application No. 62/888,574, filed on Aug. 19, 2019.

(51) Int. Cl.
| | |
|---|---|
| *G01V 1/36* | (2006.01) |
| *G01V 1/28* | (2006.01) |
| *G01V 1/48* | (2006.01) |
| *G06F 17/17* | (2006.01) |
| *G06T 7/00* | (2017.01) |

(52) U.S. Cl.
CPC ............... *G01V 1/36* (2013.01); *G01V 1/28* (2013.01); *G01V 1/48* (2013.01); *G06F 17/17* (2013.01); *G06T 7/0002* (2013.01); *G01V 2210/1234* (2013.01); *G01V 2210/16* (2013.01); *G01V 2210/51* (2013.01); *G01V 2210/614* (2013.01)

(58) Field of Classification Search
CPC .............. G01V 1/28; G01V 1/36; G01V 1/48; G01V 2210/1234; G01V 2210/16; G01V 2210/614; G01V 1/307; G01V 2210/512
See application file for complete search history.

(56) References Cited

U.S. PATENT DOCUMENTS

2018/0059276 A1*  3/2018  Roberts .................. G01V 1/282

OTHER PUBLICATIONS

Chong Zeng, Shuqian Dong, and Bin Wang, "A guide to least-squares reverse time migration for subsalt imaging: Challenges and solutions," Interpretation 5: SN1-SN11. https://doi.org/10.1190/INT-2016-0196.1 (Year: 2017).*
A. Khalil et al., "An alternative to least-squares imaging using data-domain matching filters," SEG Technical Program Expanded Abstracts, 2016, pp. 4188-4192.
Antoine Guitton, "Amplitude and kinematic corrections of migrated images for nonunitary imaging operators," Geophysics, 2004, pp. 1017-1024, vol. 69.

(Continued)

*Primary Examiner* — Ian J Lobo
(74) *Attorney, Agent, or Firm* — Patent Portfolio Builders PLLC

(57) ABSTRACT

Methods and apparatuses for seismic data processing perform a least-squares reverse time migration method in which surface-attribute-independent coefficients for the surface attribute gathers are demigrated to reduce the computational cost.

20 Claims, 9 Drawing Sheets

(56) References Cited

OTHER PUBLICATIONS

B. Tavakoli et al., "Constrained Pre-Stack LSRTM: A Better Conditioned Imaging Technique in Presence of Erroneous Migration Velocity Model," 81st EAGE Conference and Exhibition, London, UK, 2019, 5 pages.
Gerard T. Schuster, "Least-squares cross-well migration," SEG Technical Program Expanded Abstracts, 1993, pp. 110-113.
Isabelle Lecomite et al., "Resolution and illumination analyses in PSDM: A ray-based approach," 2008, The Leading Edge, pp. 650-663, vol. 27.
James E. Rickett, "Illumination-based normalization for wave-equation depth migration," Geophysics, 2003, pp. 1371-1379, vol. 68, No. 4.
Jianxing Hu et al., "Poststack migration deconvolution," Geophysics, 2001, pp. 939-952, vol. 66.
Jie Hou et al., "Accelerating extended least-squares migration with weighted conjugate gradient iteration," Geophysics, 2016, pp. 4243-4248, vol. 81, S165-S179.
Liu Yujin et al., "Multisource least-squares extended reverse time migration with preconditioning guided gradient method," SEG Technical Program Expanded Abstracts, 2013, pp. 3709-3715.
Ming Wang et al., "Improved iterative least-squares migration using curvelet-domain Hessian filters," SEG Technical Program Expanded Abstracts, 2017, pp. 4555-4560.
Ping Wang et al., "Least-squares RTM: Reality and possibilities for subsalt imaging," SEG Technical Program Expanded Abstracts, 2016, pp. 4204-4209.
Tamas Nemeth et al., "Least-squares migration of incomplete reflection data," Geophysics, 1999, pp. 208-221, vol. 64, No. 1.

\* cited by examiner

PRESTACK LEAST-SQUARE REVERSE TIME MIGRATION ON SURFACE ATTRIBUTE GATHERS COMPRESSED USING DEPTH-INDEPENDENT COEFFICIENTS

BACKGROUND

Technical Field

Embodiments of the subject matter disclosed herein generally relate to methods and devices processing seismic data using gathers based on a common surface attribute, more particularly, to efficiently demigrate these gathers, by parametrizing them using functions that only depend on the surface attribute multiplied by coefficients which only depend on subsurface location.

Discussion of the Background

The oil and gas industry customarily uses seismic exploration to locate hydrocarbon resources and plan production. Seismic waves probe the structure of underground formations. Seismic data acquired during such seismic explorations are series of amplitudes (pressure or displacement) versus time, carrying the imprint of reflections and refractions of seismic waves inside explored formations. The seismic data is processed to yield an image of underground formations' structures. Here, image does not mean a 2D single attribute visual representation, but a 3D multi-attribute synthesis of the information extracted from the seismic data.

Pre-salt targets (e.g., in Brazil's offshore) are often occluded by a geologically complex overburden. When imaging these challenging areas, wave-equation based methods such as reverse-time migration (RTM) are favored over ray-based methods such as Kirchhoff migration. RTM is able to account for complex wave paths such as turning and prismatic waves. By obtaining the exact solution of the wave equation, RTM accurately images high dips and strong velocity contrasts. Therefore, RTM is used for properly imaging formations below salt bodies where steep dips, complex geometries and velocity contrasts are commonplace.

However, RTM may suffer from amplitude distortions, especially in areas where the highly complex geology introduces irregular subsurface illumination. In this case, the reflectivity estimated from RTM may have uneven amplitudes which do not accurately represent the true subsurface reflectivity. Moreover, limitations related to field data acquisition geometries may lead to migration swings and other coherent noise as discussed in the article, "Least-squares migration of incomplete reflection data," by Nemeth et al., published in *Geophysics,* 64, pp. 208-221, 1999.

Least-squares migration (LSM) is an effective way to mitigate distortions. In LSM, one approximately inverts the demigration operator (i.e., linearized Born modeling) as opposed to the conventional approach, which simply applies the adjoint of this operator. LSM can be performed with one-step approximate inversion (as described, for example, in articles, "Poststack migration deconvolution," by Hu et al., published in *Geophysics,* 66, pp. 939-952, 2001; "Illumination-based normalization for wave-equation depth migration," published in *Geophysics* 68, pp. 1371-1379, 2003; and others) or through iterative schemes (as described, for example, in the above-cited article by Nemeth et al. or in article, "Improved iterative least-squares migration using curvelet-domain Hessian filters," by Wang et al., published in SEG Technical Program Expanded Abstracts 2017, pp. 4555-4560).

In addition to standard LSM, extended LSM has been developed to obtain parameter-dependent (e.g., surface offset, incidence angle, etc.) reflectivity information by inverting extended images as opposed to a stacked image. This approach (described, for example, in articles, "Multisource least-squares extended reverse time migration with preconditioning guided gradient method," by Liu et al., published in SEG Technical Program Expanded Abstracts 2013, pp. 3709-3715; and, "Accelerating extended least-squares migration with weighted conjugate gradient iteration," by Hou et al., published in *Geophysics* 81, pp. S165-S179, 2016) offers better convergence in the presence of mild velocity model errors and can provide a better match with the observed data. Surface offset gathers (SOGs) obtained from existing stack migration and demigration operators may be used to extend the reflectivity as depending on a surface parameter, namely the distance between source and receiver locations, or offset. Additionally, offsets can be granularized by azimuth. However, the extended demigration is more expensive because each surface attribute must be demigrated individually, whereas in a non-extended (stack) demigration, only the stacked image is demigrated.

Therefore, there is a need to further improve techniques for efficiently combining these conventional methods to achieve an accurate image of subsurface formations, including complex salt bodies.

SUMMARY

The various embodiments described in this application use a fast iterative preconditioned extended least-square migration by compressing gathers of a common surface attribute to identify few attribute-independent coefficients that need to be denigrated.

According to an embodiment, there is a method for seismic exploration including receiving seismic data acquired over an underground formation and generating surface-attribute gathers by migrating the seismic data grouped in ranges of surface attribute values. The method then performs iteratively until an iteration-stop condition is met: calculating attribute-independent coefficients for the surface-attribute gathers, the attribute-independent coefficients corresponding to predetermined functions of the surface attribute, demigrating the attribute-independent coefficients in the data domain using a stack demigration operator, generating synthetic data based on the demigrated attribute-independent coefficients and the predetermined functions of the surface attribute and migrating residuals quantifying differences between the seismic data and the synthetic data to update the surface-attribute gathers. The method then outputs an image of the underground formation based on the updated surface-attribute gathers, the image being usable to obtain geophysical properties inside the underground formation.

According to another embodiment, there is a seismic exploration apparatus having an interface for receiving seismic data acquired over an underground formation, and a data processing unit connected to the interface. The data processing unit is configured: to generate surface-attribute gathers by migrating a set of the seismic data grouped in ranges of surface attribute values; until an iteration-stop condition, ISC, is met: to calculate attribute-independent coefficients for the surface-attribute gathers, the attribute-independent coefficients corresponding to predetermined functions of the surface attribute, to demigrate the attribute-independent coefficients to the data domain using a stack demigration operator, to generate synthetic data based on the demigrated attribute-independent coefficients and the predetermined functions of the surface attribute, and to migrate residuals quantifying differences between the seismic data and the synthetic data to update the surface-attribute gathers; and to output an image of the underground formation using the updated surface-attribute gathers, the image being usable to obtain geophysical properties inside the underground formation.

According to yet another embodiment, there is a non-transitory computer readable recording medium storing executable codes which, when executed by a processor, make the processor perform a method for seismic exploration. The method includes receiving seismic data acquired over an underground formation and generating surface-attribute gathers by migrating the seismic data grouped in ranges of surface attribute values. The method then performs iteratively until an iteration-stop condition is met: calculating attribute-independent coefficients for the surface-attribute gathers, the attribute-independent coefficients corresponding to predetermined functions of the surface attribute, demigrating the attribute-independent coefficients in the data domain using a stack demigration operator, generating synthetic data based on the demigrated attribute-independent coefficients and the predetermined functions of the surface attribute and migrating residuals quantifying differences between the seismic data and the synthetic data to update the surface-attribute gathers. The method then outputs an image of the underground formation based on the updated surface-attribute gathers, the image being usable to obtain geophysical properties inside the underground formation.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

Figure 1:
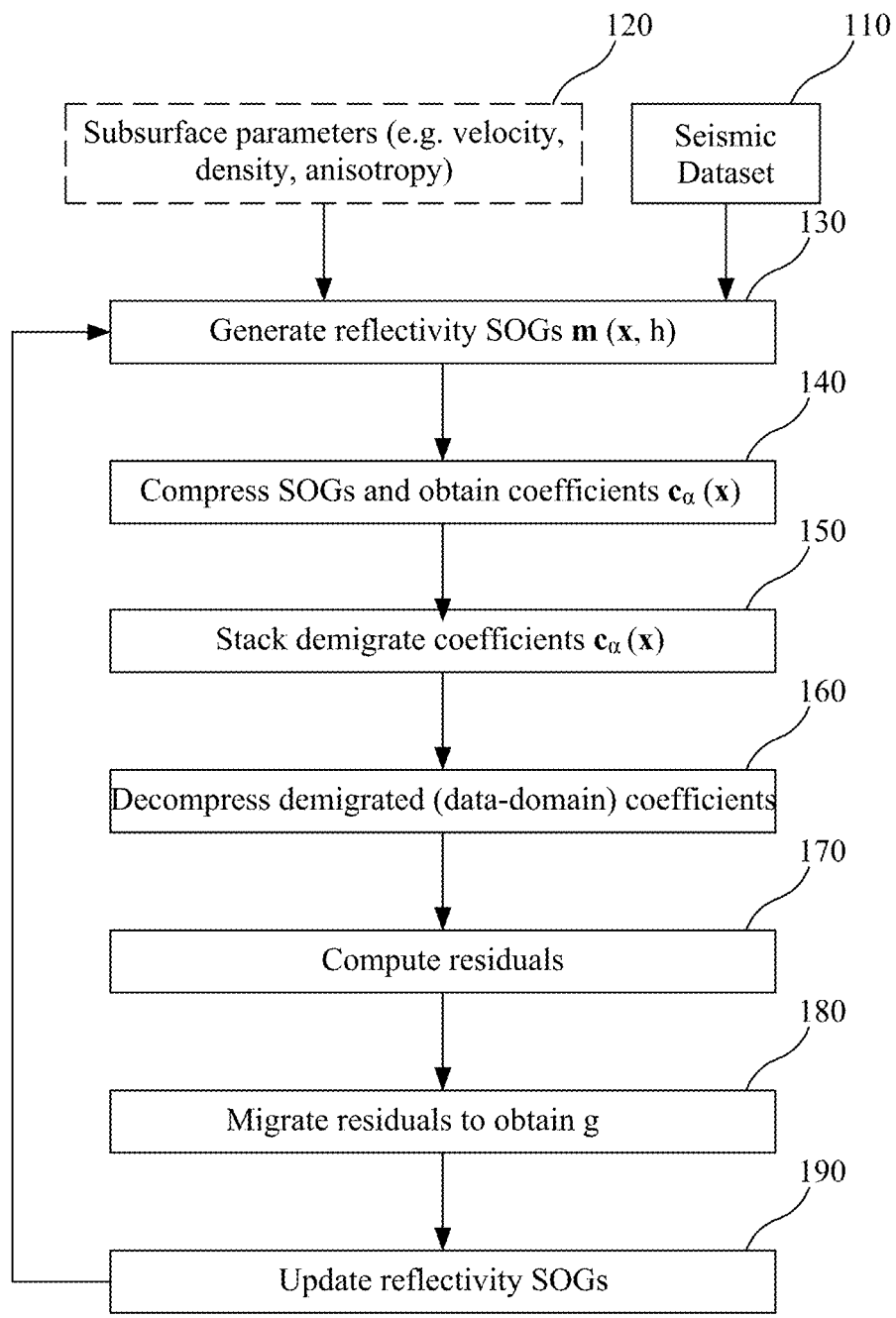
FIG. 1 is a flowchart of a method according to an embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data analysis.

Reference throughout the specification to "one embodiment" or "an embodiment" means that a particular feature, structure or characteristic described in connection with an embodiment is included in at least one embodiment of the subject matter disclosed. Thus, the phrases "in one embodiment" or "in an embodiment" in various places throughout the specification are not necessarily referring to the same embodiment. Further, the particular features, structures or characteristics may be combined in any suitable manner in one or more embodiments.

The embodiments described in this section perform a fast iterative preconditioned extended LSM to image an underground formation. The approach is characterized by compressing gathers of a common surface attribute (e.g. SOGs) by identifying few attribute-independent coefficients (fewer than the number of gathers) that need to be demigrated. This is a cost-effective prestack iterative LSRTM approach. The gathers' compression enables RTM be applied to the attribute-independent coefficients which are then decompressed in the data domain. This approach improves imaging of formations with complex overburden, including salt bodies relative to imaging obtained using standard RTM or single-iteration least-squares RTM (LSRTM).

In LSRTM, the measured seismic data d is related linearly to the subsurface reflectivity m(x,h). In extended LSRTM, the reflectivity depends on the spatial position, x=(x, y, z), and a parameter h which introduces redundancy such as surface offset or azimuth-dependent offset. The extended linearized wave-equation modeling operator L links data and extended model domain according to the following equation:

$$Lm=d. \tag{1}$$

A common approach to solving this ill-conditioned inverse problem is to minimize the least-squares data-domain cost function J(m) given by:

$$J(m)=\tfrac{1}{2}\|Lm-d\|_2^2. \tag{2}$$

Similar to the technique described in the article, "Improved iterative least-squares migration using curvelet-domain Hessian filters," by Wang et al., (published in SEG Technical Program Expanded Abstracts 2017, pp. 4555-4560), the cost function J(m) can be minimized using the negative of preconditioned gradient $$g=-HL^T(Lm-d) \tag{3}$$

where H is a curvelet-domain Hessian filter. However, other cost-function minimization methods may be used.

Conventionally, the computational cost of subsequent prestack demigration is $N_h$ times the cost of a single demigration ($N_h$ being the number of gathers corresponding to the surface attribute groups migrated). Each gather is demigrated separately to construct the prestack operator and only the part of the demigrated data that corresponds to that attribute is retained. Thus, all gathers are demigrated individually to obtain the full data. For iterative LSRTM, this increase in computational cost can quickly surpass available resources.

Instead of the above-outlined conventional approach, the computational cost of iterative prestack LSRTM is decreased by exploiting the structure of the gathers m(x, h). The depth-independent information $f_\alpha(h)$ is separated from attribute-independent coefficients $c_\alpha(x)$. Coefficients $c_\alpha(x)$ are determined to minimize the cost function C defined as $$C = \tfrac{1}{2}\|m(x,h) - \Sigma_{\alpha=1}^{N_\alpha} f_\alpha(h) c_\alpha(s)\|^2 \tag{4}$$

with $f_\alpha(h)$ representing a predetermined set of functions which depend only on h and can approximately capture the behavior of m(x, h) relative to the parameter h. Non-exclusive examples of functions $f_\alpha(h)$ are polynomials basis such as Hermite, Legendre or even standard basis: $f_\alpha(h) = h^{\alpha-1}$. The attribute-independent coefficients $c_\alpha(x)$ are then demigrated to the data domain instead of demigrating each SOG m(x,h) separately. Thus, $$Lm = \Sigma_{\alpha=1}^{N_\alpha} f_\alpha L_{stk} c_\alpha, \tag{5}$$

where $L_{stk}$ is the stack demigration operator. $L_{stk}$ is the standard demigration for an attribute-independent reflectivity. The extended demigration operator L is constructed by demigrating m(x,h) for each attribute h independently using $L_{stk}$, and then taking the corresponding attribute h from each demigration result. So, Lm does depend on h, and in equation (5) this dependence is expressed completely through $f_\alpha$.

This approach simultaneously reduces the computational cost for demigration by $N_h - N_\alpha$ times a single demigration time and diminishes noise by discarding the components of the gathers that deviate exceedingly from the compression. Unlike to the approach described in the article, "Constrained Pre-Stack LSRTM: A Better Conditioned Imaging Technique in Presence of Erroneous Migration Velocity Model," by Tavakoli et al., (published in 81st EAGE Conference and Exhibition 2019), the current approach does not use depth-dependent compression (e.g., Radon transforms in the aforementioned article). Therefore, the demigrated coefficients can be decompressed in the data domain.

The compression framework is valid for any surface attribute that has an exploitable regularity in the migrated domain. For example, SOGs have attractive properties such as reliable residual curvatures as described in the article "Improved subsalt tomography using RTM surface offset gathers," by Yang et al., published in SEG Technical Program Expanded Abstracts 2015, pp. 5254-5258. Another surface attribute can be azimuth angle, which is important when using wide- or full-azimuth seismic data.

FIG. 1 is a flowchart of a seismic exploration method according to an embodiment. The seismic dataset 110 may be acquired on land or in a marine environment. Other known subsurface parameters 120 (e.g., velocity, density, anisotropy) may optionally be used in addition to the seismic dataset when generating reflectivity SOGs. The SOGs are generated at 130 using common offset gathers (here the offset being distance between source location and receiver location). The reflectivity SOGs m(x, h) (which depend on 3D position x and offset h) are obtained by minimizing cost function $J(m) = \tfrac{1}{2}\|\vec{LM} - d\|_2^2$ for each of the common offset gathers separated from the seismic data. Here, operator L is the demigration operator (as defined in Born modeling). The cost function J(m) may be minimized using the negative of preconditioned gradient $g = -HL^T(Lm-d)$ where H is an inverse Hessian approximation such as curvelet-domain matching filter, or some such method.

Then, current SOGs m(x, h) are compressed to obtain coefficients $c_\alpha(x)$ that minimize cost function $C = \tfrac{1}{2}\|m(x,h) - \Sigma_{\alpha=1}^{N_\alpha} f_\alpha(h) c_\alpha(x)\|_2^2$ in image domain at 140.

Coefficients $c_\alpha(x)$ are then stack demigrated ($L_{stk} c_\alpha$) at 150 and decompressed in data domain as $Lm = \Sigma_{\alpha=1}^{N_\alpha} f_\alpha L_{stk} c_\alpha$ at 160 ($L_{stk}$ being the stack demigration operator). The outcome of these steps is synthetic data Lm that can be compared with the observed data d to calculate residuals in data domain at 170. The computed residuals are migrated at 180 to obtain gradient g based on which to update the reflectivity SOGs at 190 usable then for a subsequent iteration (i.e., at 130 instead of the SOGs initially generated based on the observed data). In one embodiment, the residual (i.e., the difference of acquired data d−synthetic data Lm) is used to calculate g (in equation 3); g is then used in a line search for the best minimizer, in a standard gradient descent fashion.

The above-described method has been used to analyze narrow-azimuth seismic data acquired in a region where mini-basins with volcanic intrusions sit on top of a salt body with complex geometry. The underlying structure distorts illumination because waves travel unevenly through the subsurface. The input data is migrated at 30 Hz using conventional RTM, single-iteration LSRTM (following the above-cited method of 2016 Wang), and a prestack iterative LSRTM according to an embodiment.

Figure 2:
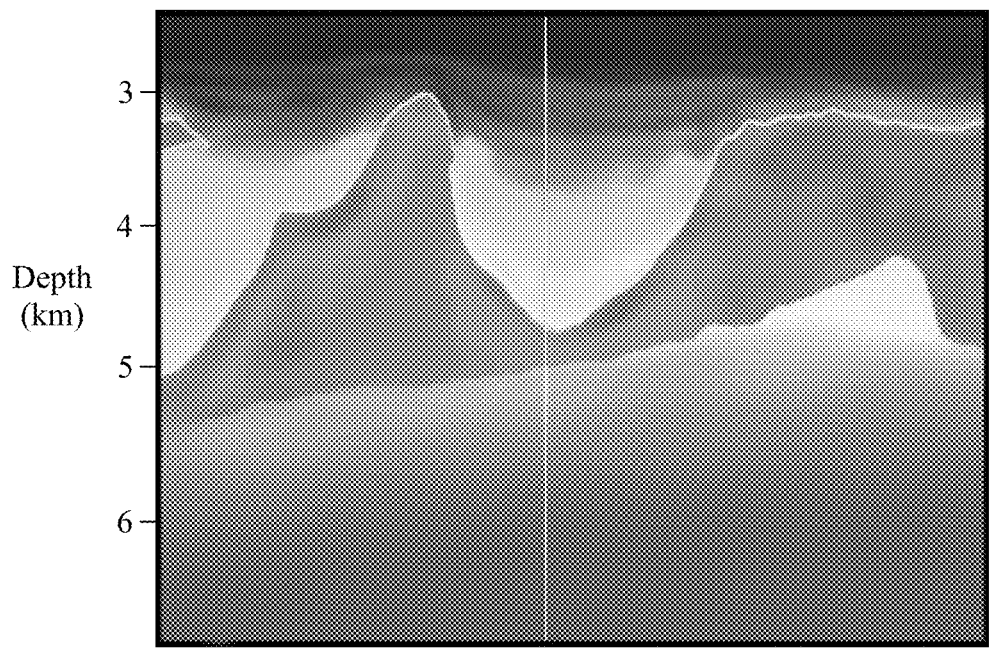
FIG. 2 is a velocity model in an inline cross-section.
Figure 5:
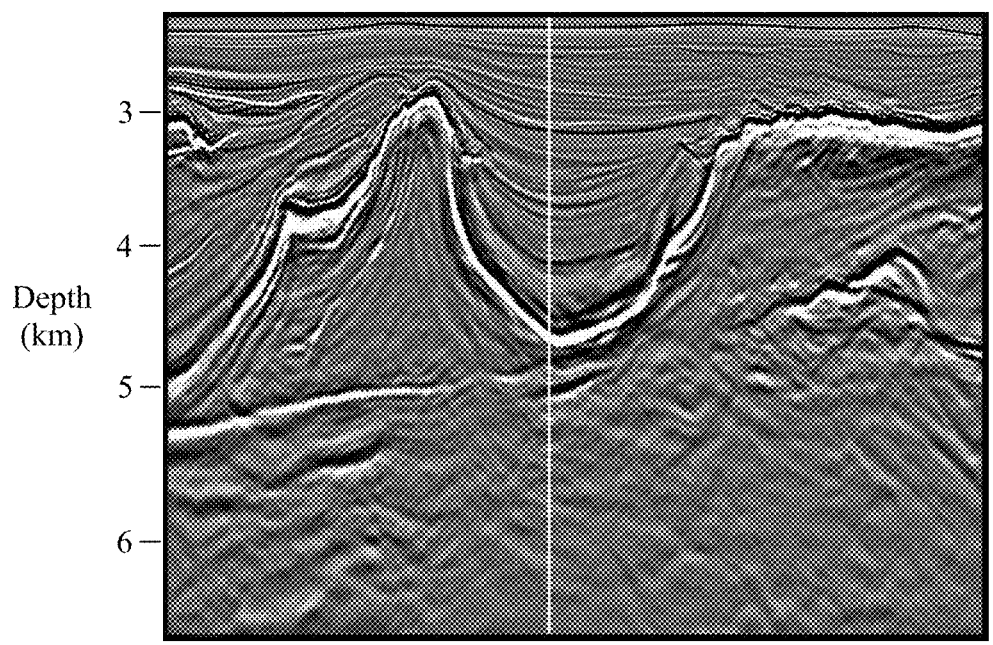
FIG. 5 is a reflectivity model corresponding to the inline cross-section in FIG. 2, obtained using prestack iterative LSRTM according to an embodiment.
Figure 6:
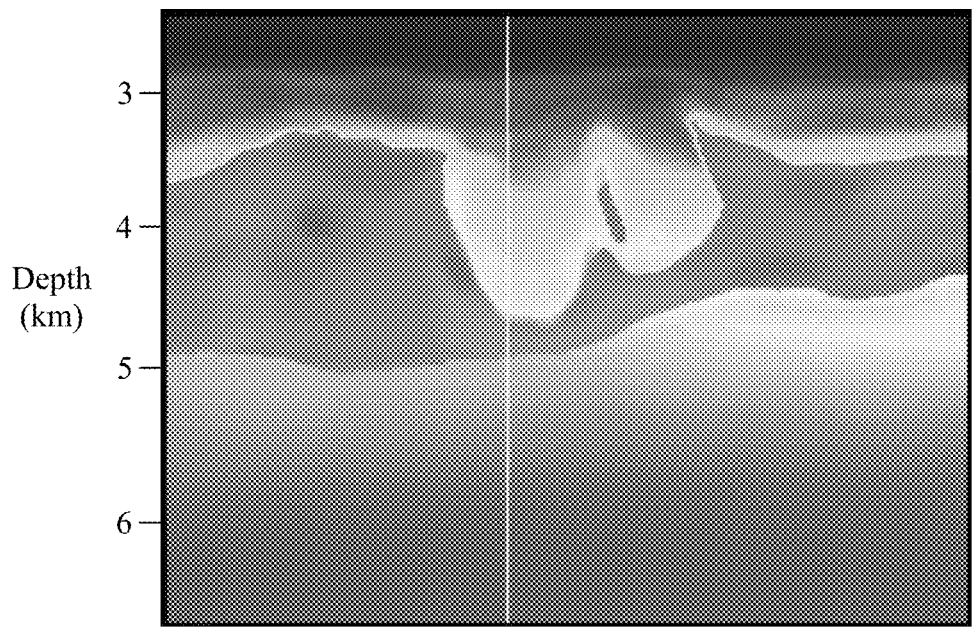
FIG. 6 is a velocity model in a crossline cross-section.
Figure 7:
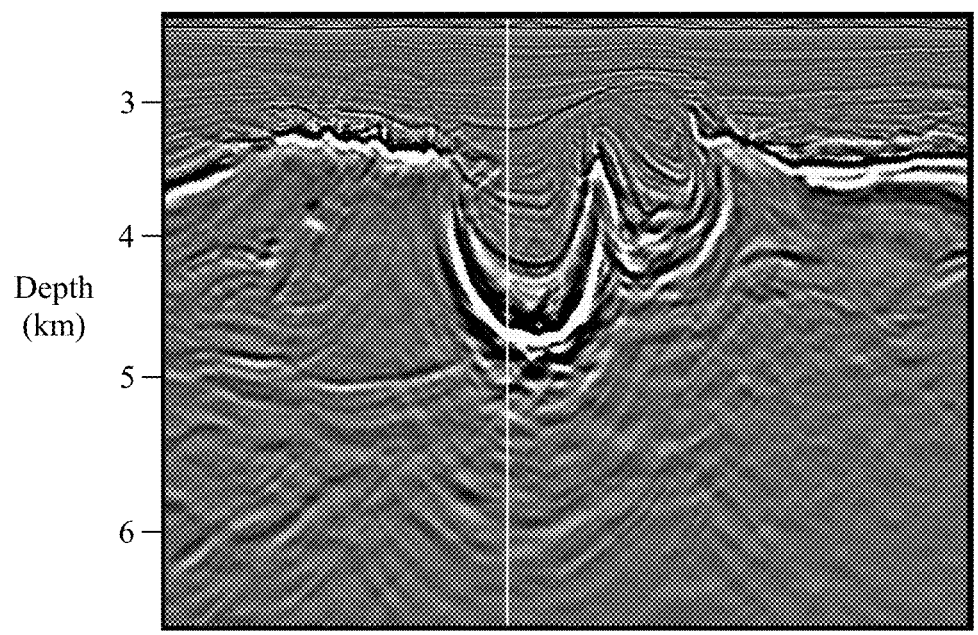
FIG. 7 is a reflectivity model corresponding to the crossline cross-section in FIG. 6, obtained using RTM.

FIGS. 2-5 illustrate the same inline cross-section with the vertical line therethrough marking the crossline cross-section illustrated in FIGS. 6-9 (similarly, the vertical lines in FIGS. 6-9 mark the inline cross-section illustrated in FIGS. 2-5). FIGS. 2 and 6 represent the velocity model, with velocities between 1,500 m/s and 5,000 m/s (illustrated with different nuances of gray), the vertical axis is depth (increasing downward) and the horizontal axis is horizontal position covering a range of 20,000 m. FIGS. 3-5 and 7-9 illustrate the reflectivity image for the same spatial coordinated as in FIGS. 2 and 6, respectively, with reflectivity values between −1.0 and 1.0 illustrated as nuances of gray (black corresponding to −1.0 and white to 1.0).

Figure 3:
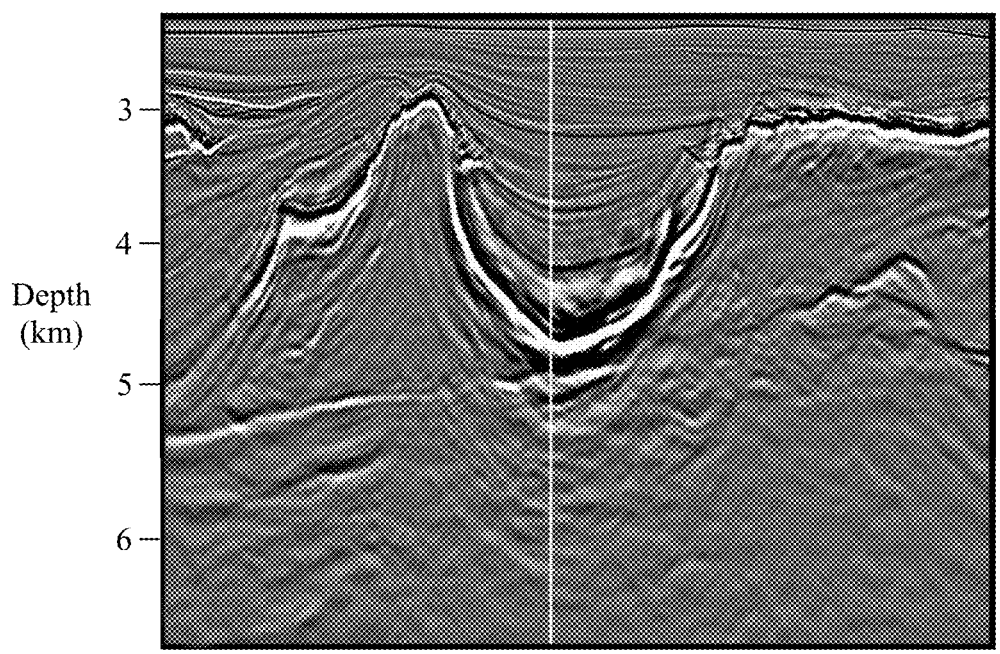
FIG. 3 is a reflectivity model corresponding to the inline cross-section in FIG. 2, obtained using RTM.
Figure 4:
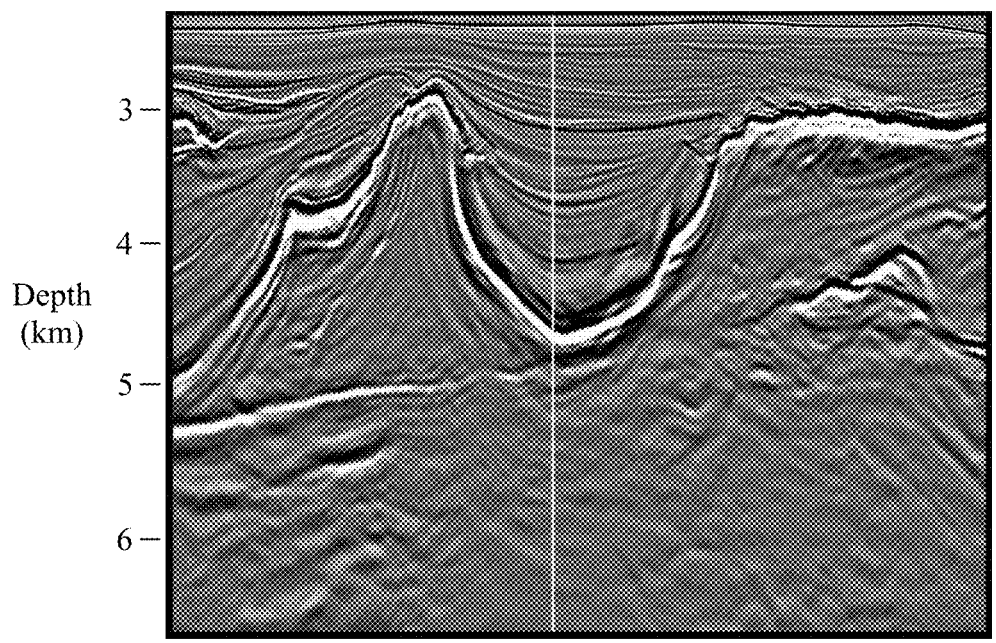
FIG. 4 is a reflectivity model corresponding to the inline cross-section in FIG. 2, obtained using single-iteration LSRTM.

FIG. 3 exemplifies problems commonly found in RTM migrations: the top-down balance of the image skews toward the shallower parts, and pre-salt regions have uneven illumination, especially reflectors at the bottom of mini-basins which display non-geological amplitudes. In the center of the image where the top and base of salt almost touch, the boosted amplitudes make it hard to distinguish the surfaces. In the single-iteration LSRTM shown in FIG. 4, this problem is somewhat overcome as top and base surfaces start to separate. In FIG. 5, prestack iterative LSRTM further improves the separation, with a gain in resolution and amplitude balancing. Indeed, for the pre-salt area located below the mini-basin, a single application of the inverse Hessian filter (single-iteration LSRTM) as in FIG. 3 results in a washing out of amplitudes, which is then corrected in prestack iterative LSRTM in FIG. 4.

Figure 8:
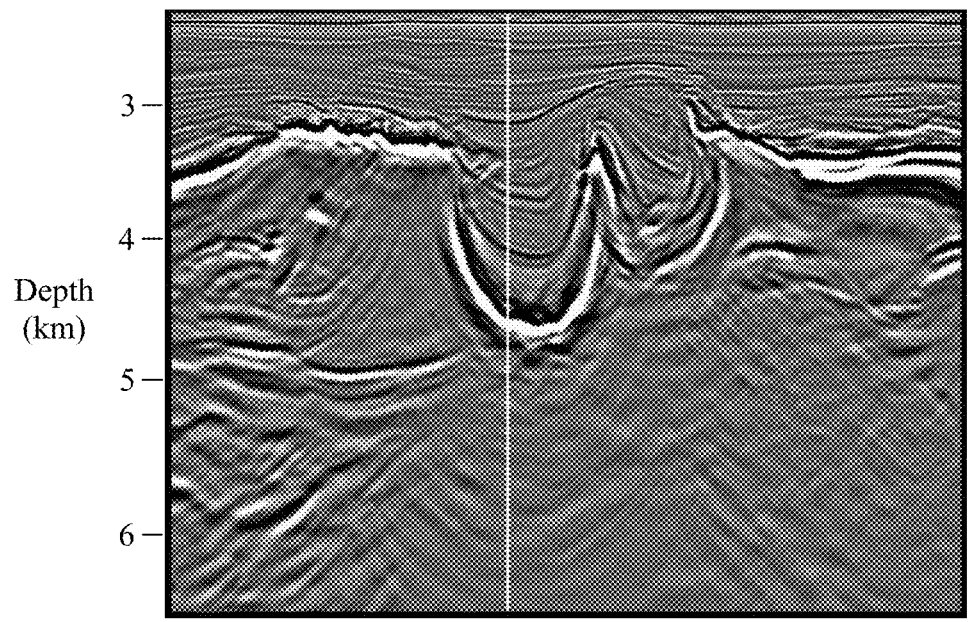
FIG. 8 is a reflectivity model corresponding to the crossline cross-section in FIG. 6, obtained using single-iteration LSRTM.
Figure 9:
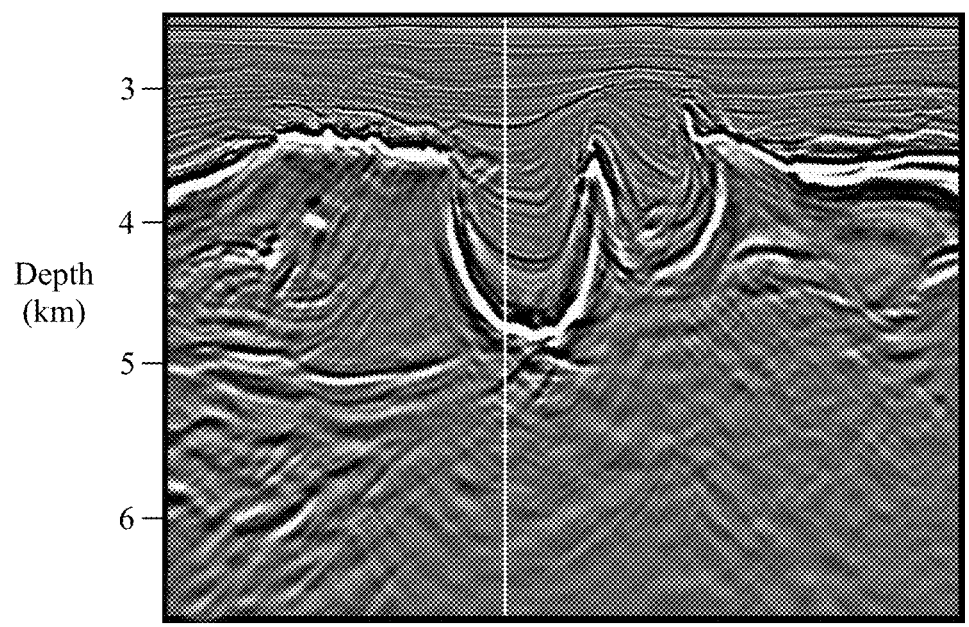
FIG. 9 is a reflectivity model corresponding to the crossline cross-section in FIG. 6, obtained using prestack iterative LSRTM according to an embodiment.

Similar amplitude and resolution effects are observed in the crossline images 6-9. Notably, the base of salt, which is obscured in RTM results in FIG. 7 and weak in single-iteration LSRTM in FIG. 8, can be clearly identified in FIG. 9, which illustrates the results of a prestack iterative LSRTM method. In addition, migration swings characteristic of narrow azimuth surveys that are observed in the results of applying RTM (FIG. 7) are attenuated in the LSRTM results (FIGS. 8 and 9).

Figure 10:
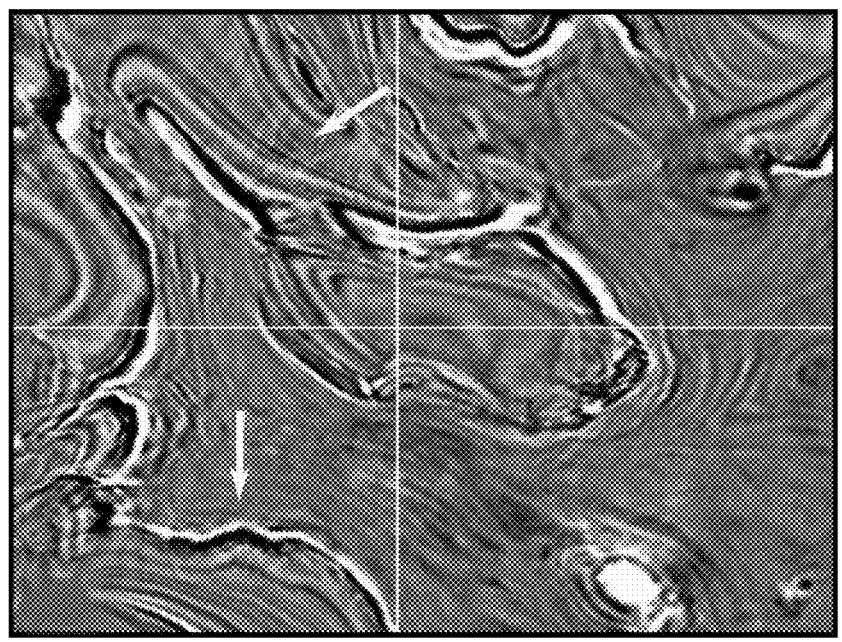
FIG. 10 represents reflectivity in a horizontal cross-section obtained using RTM.
Figure 11:
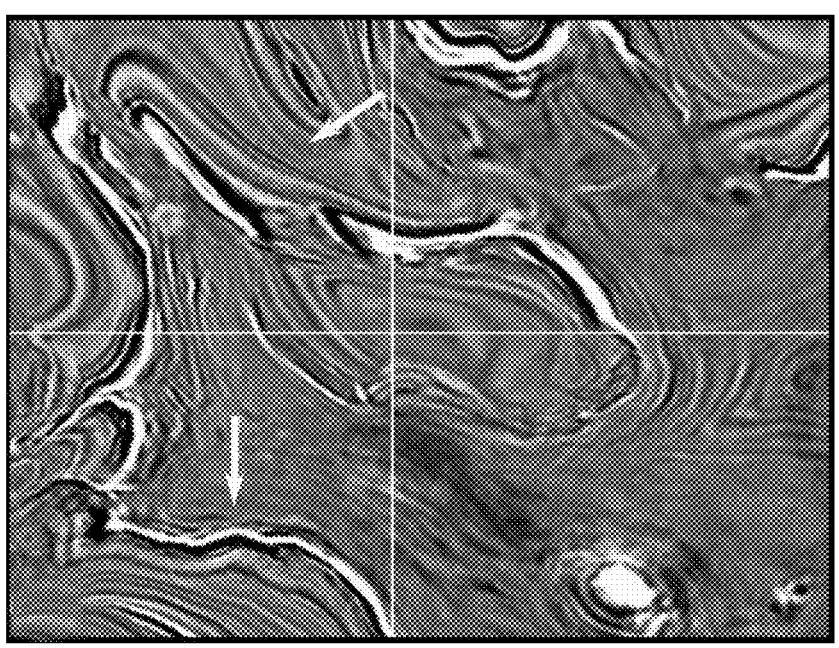
FIG. 11 represents reflectivity in a horizontal cross-section obtained using prestack iterative LSRTM according to an embodiment.

FIGS. 10 and 11 represent reflectivity in horizontal cross-sections corresponding to a 3,700 m depth (i.e., are reflectivity images of 20,000×20,000 m, with reflectivity between −1.0 and 1.0 represented with nuances of gray). The migration swings also appear in the RTM depth slice shown in FIG. 10 as indicated by the top white arrow. However, these artifacts are no longer present in the same area indicated by the top arrow in FIG. 11 (which shows the results of prestack iterative LSRTM). Moreover, as pointed out by the bottom arrow in FIGS. 10 and 11, prestack iterative LSRTM yields more detail.

Figure 12:
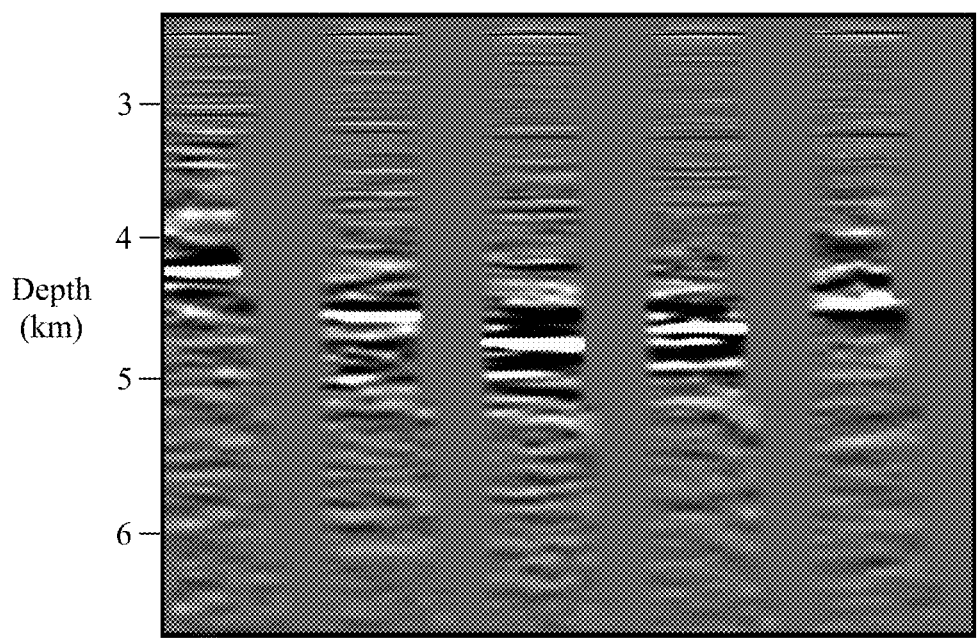
FIG. 12 illustrates SOGs obtained using RTM.
Figure 13:
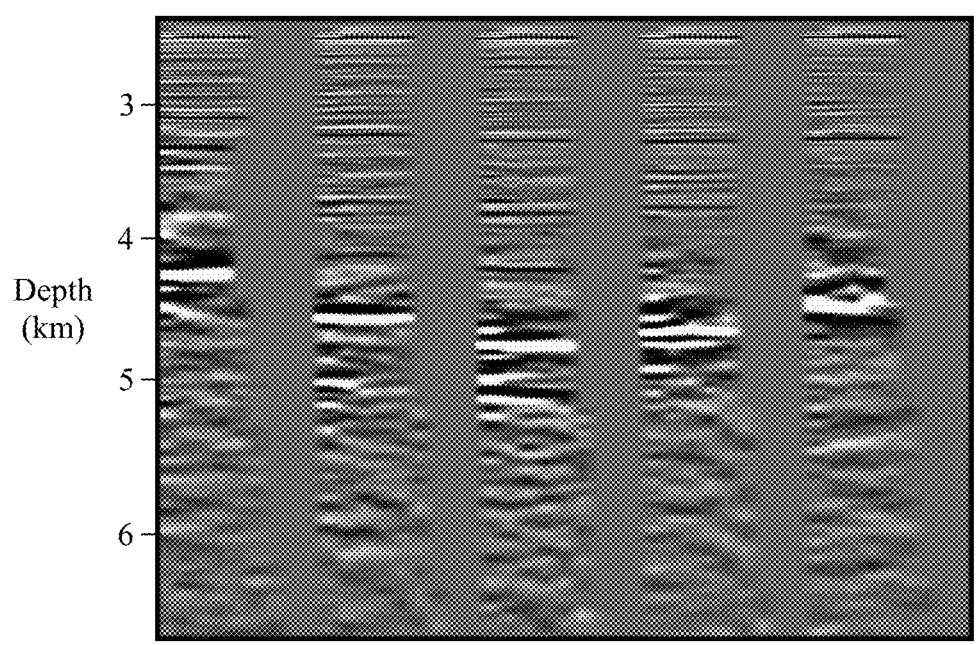
FIG. 13 illustrates SOGs obtained using prestack iterative LSRTM according to an embodiment.

FIGS. 12 and 13 illustrate SOGs obtained using RTM and prestack iterative LSRTM, respectively. The nuances of grey correspond to reflectivity similar to FIGS. 7-11. Each of the five bands of variable amplitudes FIGS. 12 and 13 represent offset-dependent reflectivity m(x, y, z, h) for five fixed x, y position. Therefore, the horizontal axis (for each individual gather) is offset h, ranging in this case from around 200 m to 7000 m. RTM SOGs display uneven amplitudes because the groups used to form the SOGs do not have the same number of traces. This is automatically corrected in prestack iterative LSRTM because amplitude variations along surface offsets are weighted by the method to decrease the cost function. In addition, the top-down balance of amplitudes is improved.

Figure 14:
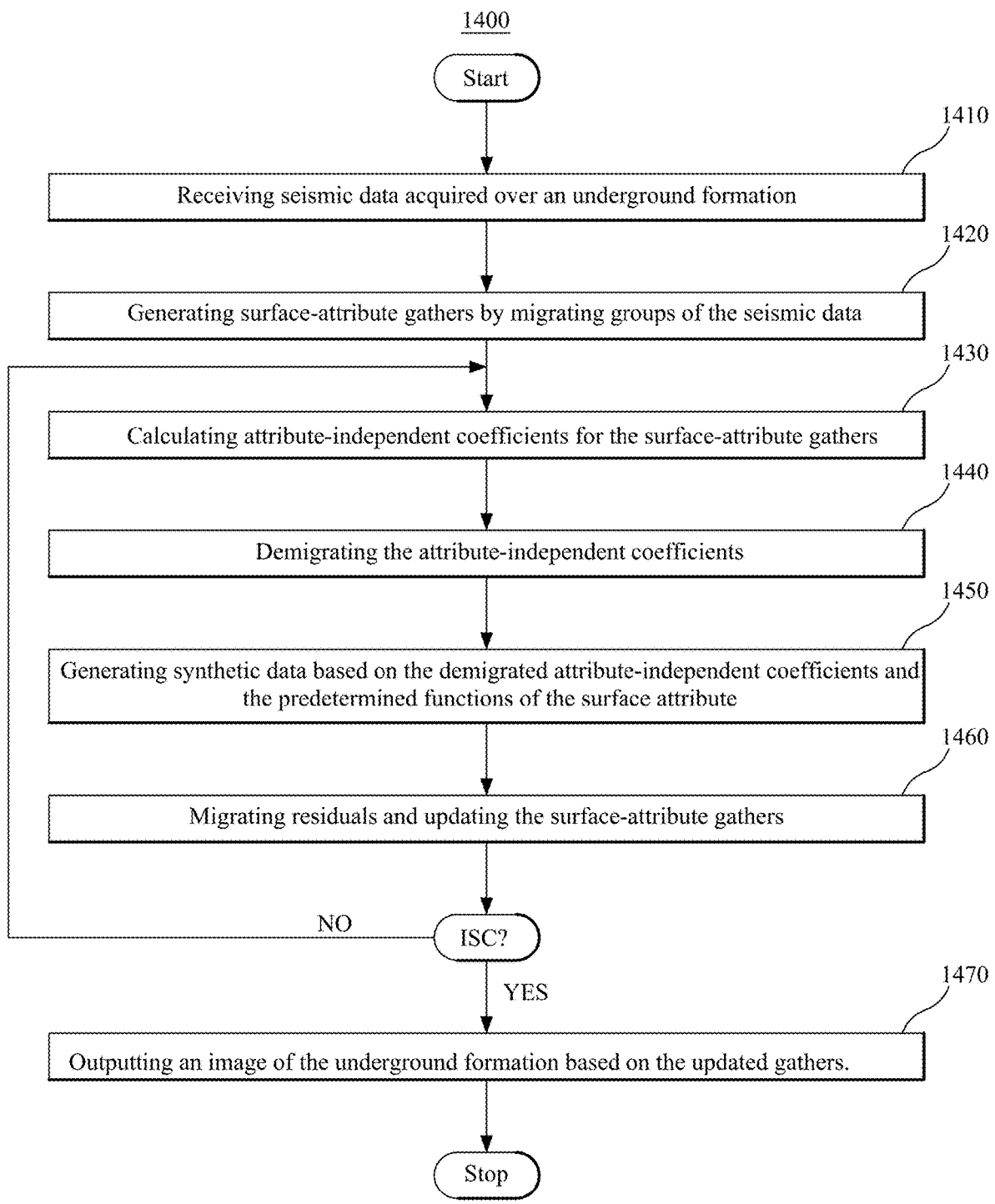
FIG. 14 is a flowchart of a method according to an embodiment.

FIG. 14 is a flowchart of a method for seismic exploration 1400 according to an embodiment. Method 1400 includes receiving seismic data acquired over an underground formation at 1410. As previously mentioned, the seismic data may be land or marine seismic data. "Obtaining" broadly means acquiring and processing on site or post-processing. Also "an underground formation" here means a geological formation under any area subjected to a seismic survey.

Method 1400 then includes generating surface-attribute gathers by migrating the seismic data grouped in ranges of surface attribute values, at 1420. For example, seismic data may be grouped in the five offset gathers with the surface offset values in respective ranges as illustrated in FIGS. 12 and 13. The reflectivity SOGs m(x, h) are obtained by minimizing a cost function $J(m)=\frac{1}{2}\|Lm-d\|_2^2$ for each of the common offset gathers separated from the seismic data.

Method 1400 further includes iteratively performing steps 1430-1450 until an iteration-stop condition, ISC, is met. Attribute-independent coefficients $c_\alpha(x)$ for the surface-attribute gathers are calculated at step 1430. These coefficients $c_\alpha(x)$ correspond to predetermined functions of surface attribute h (e.g., polynomials basis such as Hermite, Legendre or even standard basis: $f_\alpha(h)=h^{\alpha-1}$) so that a respective cost function $C=\frac{1}{2}\|m(x, h)-\Sigma_{\alpha=1}^{N_\alpha}f_\alpha(h)c_\alpha(x)\|_2^2$ is minimized. The type and number of predetermined functions are such as to represent the surface-attribute gathers' dependence of the surface attribute.

Then, at 1440, instead of the conventional demigration of the surface-attribute gathers, the attribute-independent coefficients are demigrated using a stack demigration operator $L_{stk}$. This operator is essentially reflectivity-model independent. Synthetic data is generated in data domain as $Lm=\Sigma_{\alpha=1}^{N_\alpha}f_\alpha L_{stk}c_\alpha$ at 1450. The residuals quantifying differences between the seismic data and the synthetic data are migrated to update the surface-attribute gathers at 1460. The differences between the seismic and the synthetic data may be preconditioned to enhance or suppress specific arrivals. Alternatively or additionally, the migrated residuals may be preconditioned to enhance or suppress specific subsurface structures.

Last, but not least, once an ISC (such as a predetermined number of iterations or a residual convergence-related criterion) is met, an image of the underground formation based on the updated surface-attribute gathers is output at 1470.

The image of the underground formation may be used to identifying location of hydrocarbon deposits, and, if the underground formation includes a salt body, the image is used to design a hydrocarbon exploitation plan taking into consideration salt body's outer surface as identified in the image. Drilling through salt is undesirable. Thus, using embodiments described in this section to better identify salt contour, drilling and extracting hydrocarbons from the hydrocarbon deposits is improved from cost and time perspective.

Figure 15:
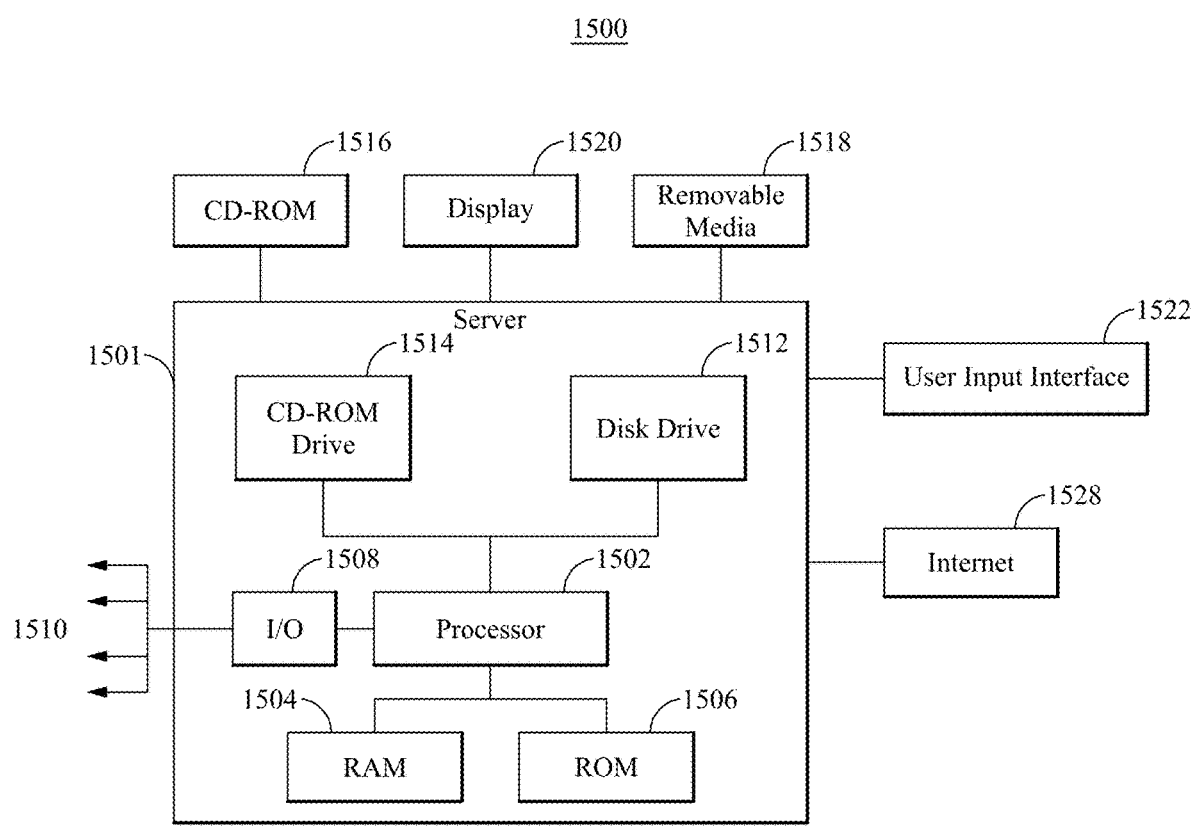
FIG. 15 is a block diagram of a seismic data processing apparatus according to an embodiment.

FIG. 15 shows a seismic data processing apparatus 1500 according to an embodiment, Apparatus 1500 is suitable for performing the prestack iterative LSRTM described in the exemplary embodiments. Server 1501 may include a central processor (CPU) 1502 and/or a graphic processor (GPU) coupled to a random-access memory (RAM) 1504 and to a read-only memory (ROM) 1506. ROM 1506 may also be other types of storage media to store programs, such as programmable ROM (PROM), erasable PROM (EPROM), etc. Processor 1502 may communicate with other internal and external components through input/output (I/O) circuitry 1508 and bussing 1510 to provide control signals and the like. Processor 1502 carries out a variety of functions as are known in the art, as dictated by software and/or firmware instructions.

Server 1501 may also include one or more data storage devices, including hard drives 1512, CD-ROM drives 1514 and other hardware capable of reading and/or storing information, such as DVD, etc. In one embodiment, software for carrying out the above-discussed steps may be stored and distributed on a CD-ROM or DVD 1516, a USB storage device 1518 or other form of media capable of portably storing information. These storage media may be inserted into, and read by, devices such as CD-ROM drive 1514, disk drive 1512, etc. Server 1501 may be coupled to a display 1520, which may be any type of known display or presentation screen, such as LCD, plasma display, cathode ray tube (CRT), etc. A user input interface 1522 is provided, including one or more user interface mechanisms such as a mouse, keyboard, microphone, touchpad, touch screen, voice-recognition system, etc.

Server 1501 may be coupled to other devices, such as seismic sources, receivers, seismic data storage units, and may be part of a larger network configuration, such as in a global area network (GAN) like the internet 1528, which allows ultimate connection to various computing devices.

In yet another embodiment, RAM 1504 stores executable codes that, when executed, make processor 1502 perform the prestack iterative LSRTM methods according to various embodiments.

The disclosed embodiments provide methods and apparatuses for seismic data processing using prestack iterative LSRTM. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration, comprising:
   receiving seismic data d acquired over an underground formation;
   generating surface-attribute gathers by migrating the seismic data grouped in ranges of surface attribute values;
   until an iteration-stop condition, ISC, is met,
      calculating attribute-independent coefficients for the surface-attribute gathers, the attribute-independent coefficients corresponding to predetermined functions of the surface attribute,
      demigrating the attribute-independent coefficients in the data domain using a stack demigration operator,
      generating synthetic data based on the demigrated attribute-independent coefficients and the predetermined functions of the surface attribute, and
      migrating residuals quantifying differences between the seismic data and the synthetic data to update the surface-attribute gathers; and
   outputting an image of the underground formation based on the updated surface-attribute gathers, the image being usable to obtain geophysical properties inside the underground formation.

2. The method of claim 1, further comprising identifying location of hydrocarbon deposits based on the image.

3. The method of claim 2, wherein the underground formation includes a salt body, and the image is used to design a hydrocarbon exploitation plan taking into consideration salt body's outer surface as identified in the image.

4. The method of claim 3, further comprising drilling and extracting hydrocarbons from the hydrocarbon deposits.

5. The method of claim 1, wherein the surface attribute is offset and the surface-attribute gathers are surface offset gathers, SOGs, m(x, h) generated by minimizing a cost function $J(m)=\frac{1}{2}\|Lm-d\|_2^2$ for each of group of common offset range separated from the seismic data d.

6. The method of claim 1, wherein the ISC is a specific number of iterations.

7. The method of claim 1, wherein the ISC is a convergence criterion related to the residuals.

8. The method of claim 1, wherein the predetermined functions are polynomials.

9. A seismic exploration apparatus, comprising:
   an interface for receiving seismic data acquired over an underground formation; and
   a data processing unit connected to the interface and configured:
      to generate surface-attribute gathers by migrating a set of the seismic data grouped in ranges of surface attribute values;
      until an iteration-stop condition, ISC, is met: to calculate attribute-independent coefficients for the surface-attribute gathers, the attribute-independent coefficients corresponding to predetermined functions of the surface attribute, to demigrate the attribute-independent coefficients in the data domain using a stack demigration operator, to generate synthetic data based on the demigrated attribute-independent coefficients and the predetermined functions of the surface attribute, and to migrate residuals quantifying differences between the seismic data and the synthetic data to update the surface-attribute gathers; and
      to output an image of the underground formation using the updated surface-attribute gathers, the image being usable to obtain geophysical properties inside the underground formation.

10. The seismic exploration apparatus of claim 9, wherein the data processing unit is further configured to identify location of hydrocarbon deposits based on the image.

11. The seismic exploration apparatus of claim 10, wherein the underground formation includes a salt body, and the data processing unit uses the image to design a hydrocarbon exploitation plan taking into consideration salt body's outer surface as identified in the image.

12. The seismic exploration apparatus of claim 9, wherein the surface attribute is offset and the surface-attribute gathers are surface offset gathers, SOGs, m(x, h) generated by minimizing a cost function $J(m)=\frac{1}{2}\|Lm-d\|_2^2$ for each of group of common offset range separated from the seismic data d.

13. The seismic exploration apparatus of claim 9, wherein the ISC is a specific number of iterations.

14. The seismic exploration apparatus of claim 9, wherein the ISC is a convergence criterion related to the residuals.

15. The seismic exploration apparatus of claim 9, wherein the predetermined functions are polynomials.

16. A non-transitory computer readable recording medium storing executable codes which, when executed by a processor, make the processor perform a method for seismic exploration, comprising:
    receiving seismic data acquired over an underground formation;
    generating surface-attribute gathers by migrating the seismic data grouped in ranges of surface attribute values;
    until an iteration-stop condition, ISC, is met,
       calculating attribute-independent coefficients for the surface-attribute gathers, the attribute-independent coefficients corresponding to predetermined functions of the surface attribute;
       demigrating the attribute-independent coefficients in the data domain using a stack demigration operator;
       generating synthetic data based on the demigrated attribute-independent coefficients and the predetermined functions of the surface attribute;
       migrating residuals quantifying differences between the seismic data and the synthetic data to update the surface-attribute gathers; and
    outputting an image of the underground formation based on updated surface-attribute gathers, the image being usable to obtain geophysical properties inside the underground formation.

17. The non-transitory computer readable recording medium of claim 16, wherein the method further comprises identifying location of hydrocarbon deposits based on the image, and if the underground formation includes a salt body, and the image is used to design a hydrocarbon exploitation plan taking into consideration salt body's outer surface as identified in the image.

18. The non-transitory computer readable recording medium of claim 16, wherein the surface attribute is offset and the surface-attribute gathers are surface offset gathers, SOGs, m(x, h) generated by minimizing a cost function $J(m)=\frac{1}{2}\|Lm-d\|_2^2$ for each of group of common offset range separated from the seismic data d.

19. The non-transitory computer readable recording medium of claim 16, wherein the ISC is a specific number of iterations or a convergence criterion related to the residuals.

20. The non-transitory computer readable recording medium of claim 16, wherein the predetermined functions are polynomials.

* * * * *